United States Patent
Ballheimer et al.

(10) Patent No.: US 6,311,532 B1
(45) Date of Patent: Nov. 6, 2001

(54) METHOD AND DEVICE FOR REDUCING OR COMPENSATING ROTATIONAL SPEED LOSSES DURING INSERTION OR ROLLING STOCK IN A ROLL STAND

(75) Inventors: Werner Ballheimer; Ansgar Grüss, both of Erlangen; Bernhard Weisshaar, Herzogenaurach, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,767

(22) PCT Filed: Jun. 9, 1998

(86) PCT No.: PCT/DE98/01587

§ 371 Date: May 9, 2000

§ 102(e) Date: May 9, 2000

(87) PCT Pub. No.: WO98/58752

PCT Pub. Date: Dec. 30, 1998

(30) Foreign Application Priority Data

Jun. 23, 1997 (DE) .............................................. 197 26 586

(51) Int. Cl.[7] .................................................. B21B 37/58
(52) U.S. Cl. ............................................. 72/10.3; 72/10.4
(58) Field of Search ..................................... 72/10.1, 10.2, 72/10.3, 10.4, 8.8, 11.5; 700/151, 152

(56) References Cited

U.S. PATENT DOCUMENTS

| 5,103,662 | * | 4/1992 | Fapiano | 72/10.3 |
| 5,233,852 | * | 8/1993 | Starke | 72/7 |

FOREIGN PATENT DOCUMENTS

| 0 680 138 | 11/1995 | (EP) . | |
| 60-166115 | * | 8/1985 | (JP) | 72/10.3 |

OTHER PUBLICATIONS

Patent Abstracts of Japan, vol. 096, No. 006, Jun. 28 1996 & JP 08 033911 A (Fuji Electric Co. Ltd.), Feb. 6, 1996.
Patent Abstracts of Japan, vol. 096, No. 001, Jan. 31, 1996 & JP 07 245975 A (Toshiba corp.), Sep. 19, 1995.
Patent Abstracts of Japan, vol. 095, No. 001, Feb. 28, 1995 & JP 06 284763 A (Nagoya Kogyo Univ) Oct. 7, 1994.

\* cited by examiner

*Primary Examiner*—Ed Tolan
(74) *Attorney, Agent, or Firm*—BakerBotts LLP

(57) ABSTRACT

Method and device for the reduction and/or compensation of speed drops when threading rolled stock into a roll stand whose rolling speed is controlled with a controller, the controller outputting a predefined supplementary value independently of its input in a predefined transition time interval shortly before, during, or shortly after the rolled sock is threaded into the roll stand.

26 Claims, 3 Drawing Sheets

METHOD AND DEVICE FOR REDUCING OR COMPENSATING ROTATIONAL SPEED LOSSES DURING INSERTION OR ROLLING STOCK IN A ROLL STAND

This application is a 35 USC 371 of PCT /DE98/01587 field Jun. 9, 1998.

FIELD OF THE INVENTION

The present invention relates to a method and a device for the reduction and/or compensation of speed drops when threading rolled stock into a roll stand whose rolling speed is controlled using a controller.

BACKGROUND INFORMATION

In a production line, the incoming strip stock causes an abrupt load In each stand on the first pass. For the roll drive, this signifies a steep increase of the moment of load. Due to the finite moment of inertia of the drive, made up of the moments of inertia of the motor, the couplings, spindles, gears and rollers, the speed of the drive drops initially. Thereafter, the speed controller brings the speed back to its setpoint. The drop in speed causes a deceleration of the incoming strip as compared to the setpoint speed predetermined in the schedule of passes, resulting in a backward slip of the material. This backward slip is expressed in the formation of a kink in the strip downstream from the stand. This kink may only be of such a magnitude that it can be controlled by the kink control and the kink lifter. The precision of the run-out thickness of the strip is also influenced.

In the case of high demands on the magnitude of the kink, primarily with short load increase times such as occur on the last stands of a production line, a standard PI speed controller is frequently not sufficiently dynamic.

SUMMARY PRESENT

An, object of the present invention is to provide a method and a device for the reduction and/or compensation of speed drops when threading rolled stock into a roll stand.

The objective is attained according to the present invention by a method and a device which considerably reduce speed drops as shown, for. example, in FIG. 3.

The method according to the present invention is used to particular advantage for I controllers or partial subgroup controllers designed as I controllers.

It is of particular advantage to use the method according to the present invention for a speed controller. If speed control is supplemented by a load monitor, integrators being used to model the path dynamics, then the method according to the present invention is also used advantageously for the integrators or a portion of the integrators for modeling the path dynamics in the load monitor.

DETAILED DESCRIPTION

Figure 1:
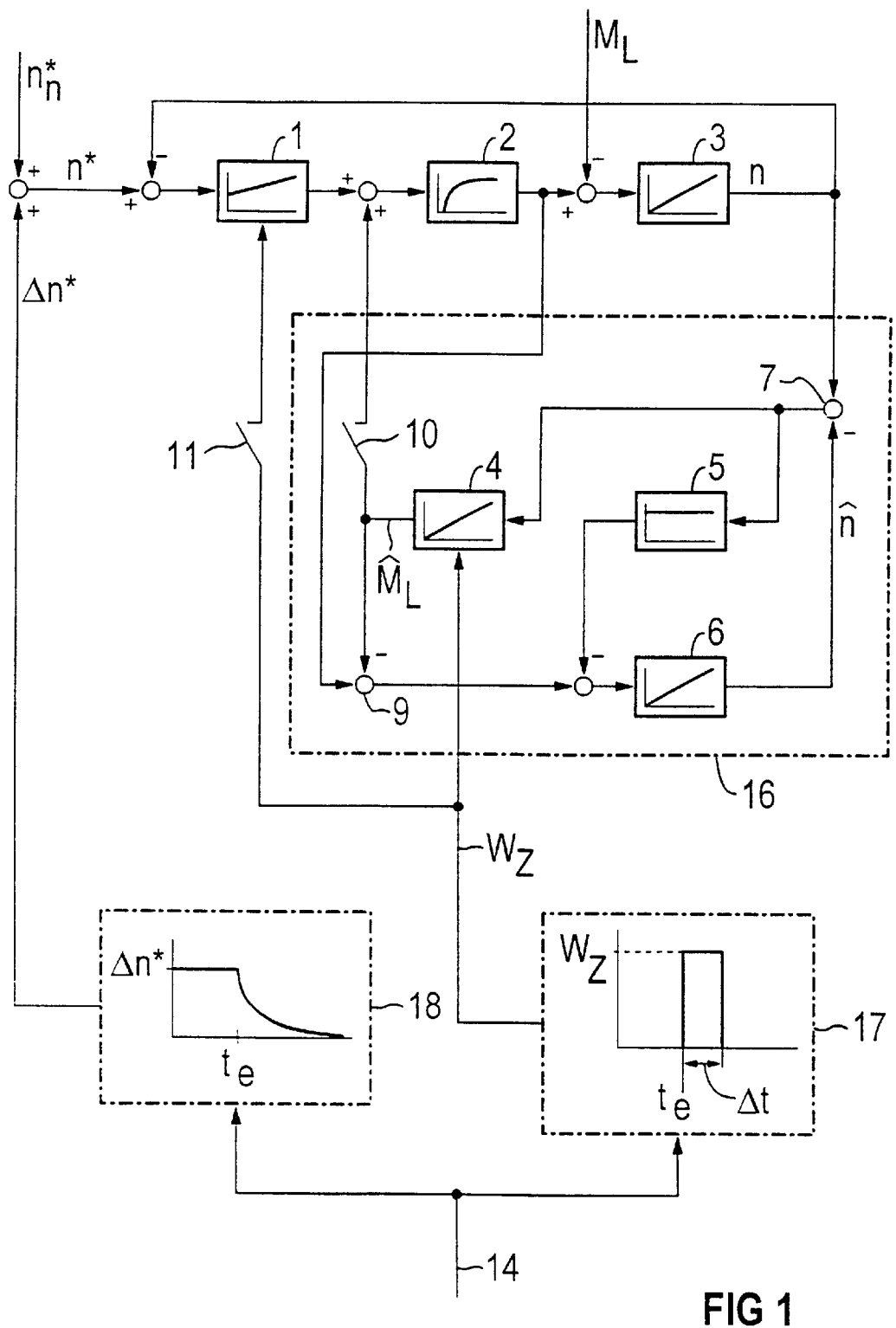
FIG. 1 shows an exemplary embodiment of a control which is connected according to the present invention.

FIG. 1 shows a block diagram of a controller according to the present invention. The roll stand is driven via a motor 2 controlled big a power circuit, a moment of load $M_L$ acting against the motor torque. In this connection, the roll speed is the integral of the difference of the drive torque and moment of load. This physical relationship is modeled by integrator 3. This controlled system is controlled in the exemplary embodiment by a PI controller 1 as a function of the difference of desired speed n* and actual speed n. In one embodiment according to the invention, when rolled stock, particularly a rolled strip, is threaded into the roll stand, a supplementary value $W_Z$ for a specified transition time interval $\Delta t$ is output by the I component of the PI controller independently of its input.

In order to reduce the speed drop, a load monitor 16 is provided in the exemplary embodiment. It has a feedback integrator 6, a proportional element 8 and a load integrator 4. At summing point 7, speed R simulated by integrator 6) is compared with the measured speed n of the motor. The difference, among other things, is supplied to load integrator 4. In the steady-state condition, its output $M_L$ corresponds to the steady-state moment of load $M_L$. In summing unit 9, the latter is compared with the measured motor torque (motor current x flux) and the difference is supplied to integrator 6. The simulated moment of load $M_L$ is added to the spend controller output when switch 10 is closed. The speed controller can then be operated as a P controller.

For further improvement, the method according to the present invention can be used for load monitor 16, for load integrator 4 in particular.

Rolling force signal 14 in FIG. 1 servos as a trigger signal for the first pass. when rolling force signal 14 occurs, supplementary value generator 17 outputs a supplementary value $W_Z$ for the duration of transition time interval $\Delta t$. This supplementary value $W_Z$ is the input variable into load integrator 4 and/or, if a load monitor 16 is used, in the I component of PI controller 1. If supplementary value $W_Z$ is present, the load integrator 4 (i.e., the I component of PI controller 1) outputs supplementary value $W_Z$ independently of its input. Advantageously, supplementary value $W_Z$ amounts to twice the expected moment of load $M_L$. In a further development, (with switch 11 closed), supplementary value $W_Z$ may also be supplied only to the integral component (I component) of the PI controller. Switch 10 of the output of load monitor 16 is then open or no load monitor is provided.

Supplementary value $W_Z$ may be a time-dependent value or, advantageously, a constant value. Advantageously, this value amounts to 1.5 to 2.5 times, 2 times in particular, the expected moment of load when the rolled stock is threaded into the roll staid. The transition time interval is advantageously 10 msec to 100 msec, in particular, 20 msec to 40 msec long.

As a supplement to the method according to the present invention, a speed correction unit 18 can be used which outputs a correction setpoint value $\Delta n^*$ as described in, for example, Japanese Patent Application Nos. 833911, 7245975 and 6284763. Already before the first pass, the correction setpoint value $\Delta n^*$, which is a function Co the absolute value of the moment of load to be expected, is added to the desired speed setpoint value $n_N^*$, resulting in an actual setpoint speed n*. At the time of the first pass, i.e., threading time $t_e$, which is also detected via rolling force signal 14, correction setpoint value $\Delta n^*$ is canceled according to a suitable time function.

Figure 4:
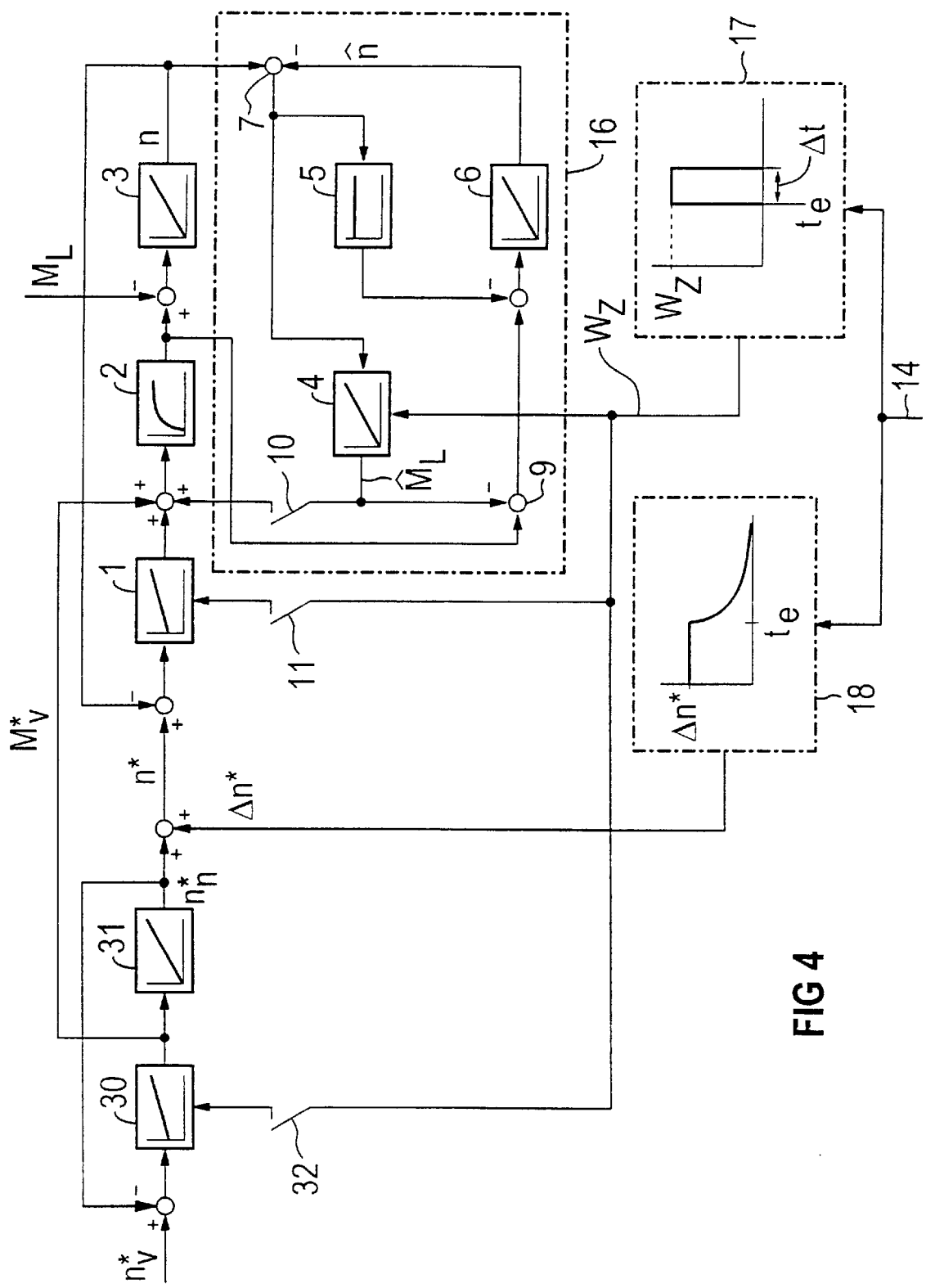
FIG. 4 shows an exemplary embodiment of a control and precontrol which are connected according to the present invention.

Accordingly, as shown in FIG. 4 (element 18) the rolled stock may be threaded into the roll stand with the setpoint speed (n*) of the rollers of the roll stand being increased by a predefined value (Δn*) and thereafter reduced to a desired setpoint speed ($N_n^*$) after threading-in the rolled stock. Moreover, it is contemplated that the setpoint speed (n*) is reduced or lowered according to a hyperbole.

Figure 2:
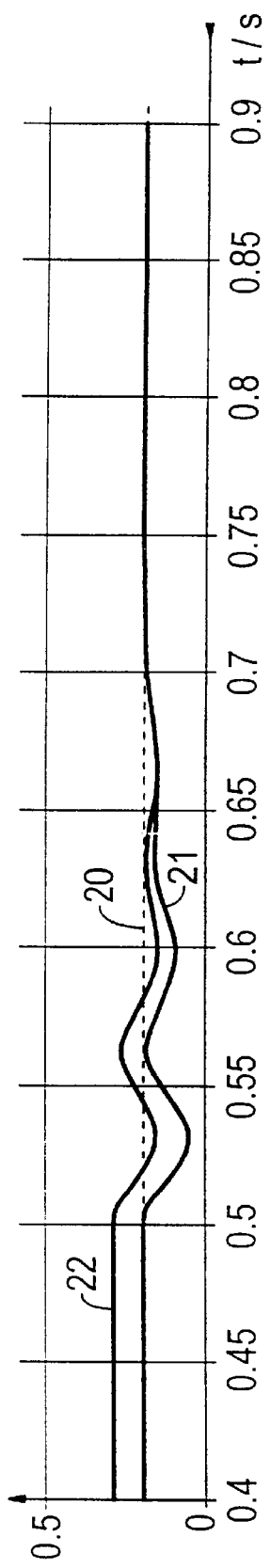
FIG. 2 shows the result of a convational method for the reduction of speed drops.

FIG. 2 shows the variation of the speed of rolling over time t during threading of a rolled strip. The rolled strip is threaded in at time 0.5. Reference symbol 20 identifies the desired setpoint speed. Reference symbol 21 identifies the speed drop with simple speed control without additional measures. Reference symbol 22 shows by way of example the speed variation when a known correction setpoint transmitter as is identified in FIG. 1 with reference symbol 18 is used.

Figure 3:
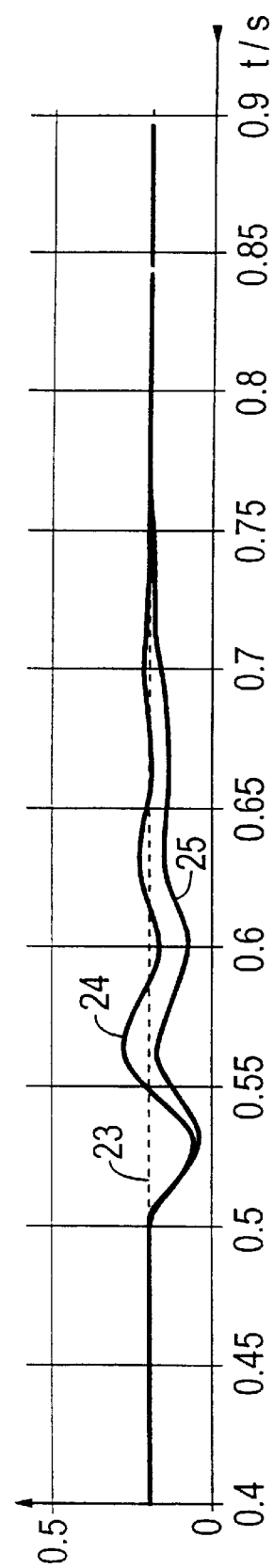
FIG. 3 shows the result when the method according to the present invention is used to reduce speed drops.

FIG. 3 shows the speed variation in the method according to the present invention. The rolled strip is threaded in at time 0.5. Reference symbol 23 identifies the desired setpoint speed. Reference symbol 25 identifies the speed drop with simple speed control without additional measures. Reference symbol 24 identifies the speed of rolling when the method according to the invention is used with a load monitor corresponding to reference symbol 16 in FIG. 1.

FIG. 4 shows an exemplary embodiment of the present invention according to FIG. 1 having an additional precontrol. The precontrol has a PI element 30 and an I element 31. At the output of PI element 30, which is embodied as controller 1, a moment setpoint value $M_v^*$ is picked off. At the output of I element 31, setpoint speed value $n_n^*$ is generated according to the corresponding setpoint value in FIG. 1. The input variable into the precontrol is a speed setpoint value $n_v^*$. Via an optional switch 32, supplementary value $W_z$ is also supplied to PI element 30 in the precontrol.

What is claimed is:

1. A method for one of reducing and compensating for speed drops when threading rolled stock into a roll stand, comprising:
   controlling a rolling speed with a controller;
   threading the rolled stock into the roll stand; and
   outputting, by the controller, a specified supplementary value independently of input to the controller in a predefined transition time interval to control the rolling speed, the supplementary value being output one of before, during and after the threading step.

2. The method according to claim 1, wherein the controller includes at least two sub-controllers, at least one of the sub-controllers outputting the supplementary value in the transition time interval independently of input to the at least one of the sub-controllers.

3. The method according to claim 1, wherein the controller includes at least two parallel partial subgroup controllers, at least one of the partial subgroup controllers outputting the supplementary value in the transition time interval independently of input to the at least one of the partial subgroup controllers.

4. the method according to claim 3, wherein at least one of the partial subgroup controllers is an I controller.

5. The method according to claim 1, wherein the supplementary value is constant.

6. The method according to claim 1, wherein the supplementary value is between 1.5 and 2.5 times an expected moment of load when the rolled stock is threaded into the roll stand.

7. The method according to claim 6, wherein the supplementary value is 2 times the expected moment.

8. The method according to claim 1, wherein the transition tame interval is between 10 ms and 100 ms.

9. The method according to claim 8, wherein the transition time interval is between 20 ms and 40 ms.

10. The method according to claim 1, wherein the controller includes one of a load monitor and a speed controller.

11. The method according to 10, further comprising:
    increasing a set point of the rollers of the roll stand by a predefined value prior to the threading step; and
    reducing the set point speed to a desired set point speed for the rolling after the threading step.

12. The method according to claim 11, wherein the reducing step includes reducing the set point speed according to a hyperbola.

13. A method for one or reducing and compensating for speed drops when threading rolled stock into a roll stand, comprising:
    controlling a rolling speed with a controller;
    threading the rolled stock into the roll stand; and
    adding an output of the controller to a predefined supplementary value in a predefined transition time interval to control the rolling speed, the output being added one of before, during and after the threading step.

14. The method according to claim 13, wherein the controller includes at least two sub-controllers, at least one of the sub-controllers outputting the supplementary value the predefined transition time interval independently of input to the at least one of the sub-controllers.

15. The method according to claim 13, wherein the controller includes at least two parallel partial subgroup controllers, at least one of the partial subgroup controllers outputting the supplementary value in the predefined transition time interval independently of input to the at least one of the partial subgroup controllers.

16. The method according to claim 15, wherein at least one of the partial subgroup controllers is an I controller.

17. The method according to claim 13, wherein the supplementary value is constant.

18. The method according to claim 13, wherein the supplementary value is between 1.5 and 2.5 times an expected moment of load when the rolled stock is threaded into the roll stand.

19. The method according to claim 18, wherein the supplementary value is 2 times the expected moment.

20. The method according to claim 13, wherein the transition time interval is between 10 ms and 100 ms.

21. The method according to claim 20, wherein the transition time interval is between 20 ms 40 ms.

22. The method according to claim 13, wherein the controller includes one of a load monitor and a speed monitor.

23. The method according to 22 further comprising:
    increasing a set point of the rollers of the roll stand by a predefined value prior to the threading step; and
    reducing the set point speed to a desired set point speed for the rolling after the threading step.

24. The method according to claim 23, wherein the reducing step includes reducing the set point speed according to a hyperbola.

25. A device for one of reducing and compensating for speed drops when threading rolled stock into a roll stand, comprising:
    a controller controlling a rolling speed; and
    a supplementary value generator defining a supplementary value, the controller outputting the supplementary value at least one of before, during and after the rolled stock is threaded into the roll stand, independently of input to the controller and in a predefined transition time interval.

26. A device for one of reducing and compensating for speed drops when threading rolled stock into a roll stand, comprising:

a controller controlling a rolling speed; and a supplementary value generator defining a supplementary value, an output of the controller being added to the supplementary value at least one of before, during and after the rolled stock is threaded into the roll stand in a predefined transition time interval.

* * * * *